F. C. WASSMAN & M. E. WIDELL.
SOLDERING MACHINE.
APPLICATION FILED MAR. 5, 1908.
975,912.
Patented Nov. 15, 1910.
3 SHEETS—SHEET 2.
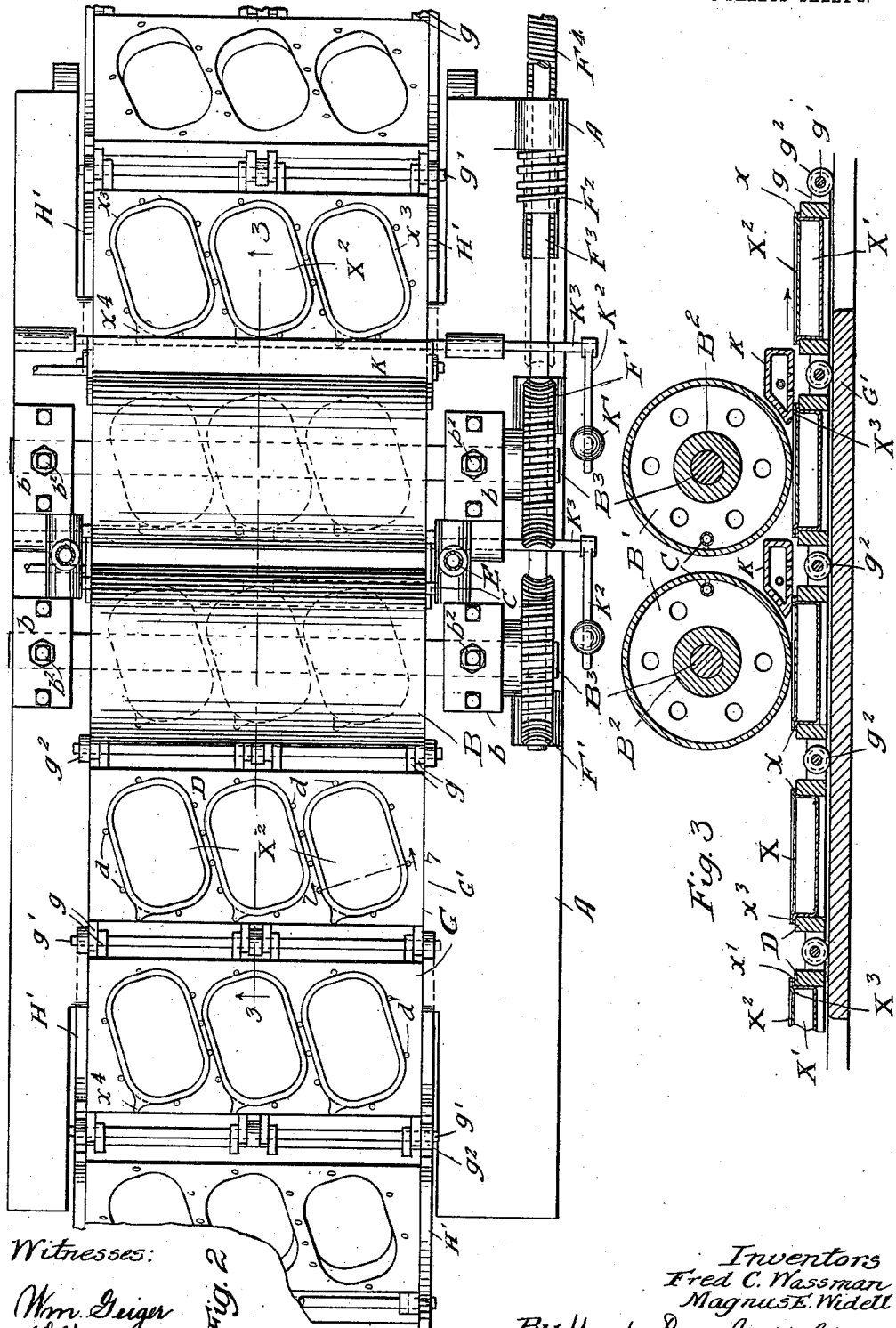
Witnesses:
Wm. Geiger
H. W. Munday
Inventors
Fred C. Wassman
Magnus E. Widell
By Munday, Evarts, Adcock & Clarke
Attorneys F. C. WASSMAN & M. E. WIDELL.
SOLDERING MACHINE.
APPLICATION FILED MAR. 5, 1908.
975,912.
Patented Nov. 15, 1910.
3 SHEETS—SHEET 3.
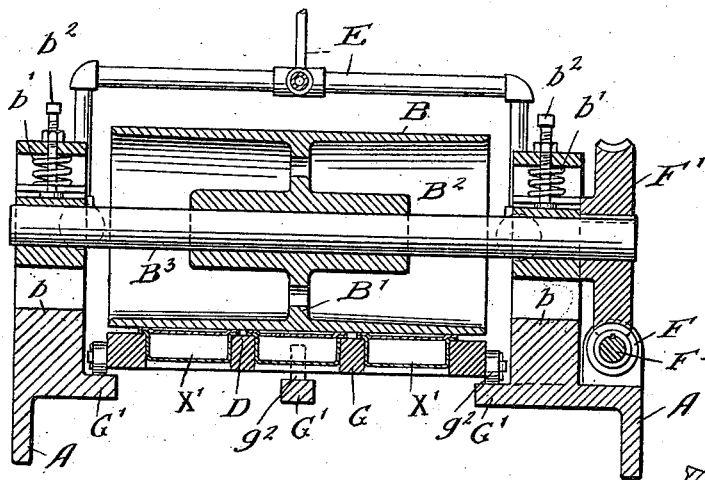
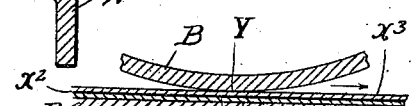
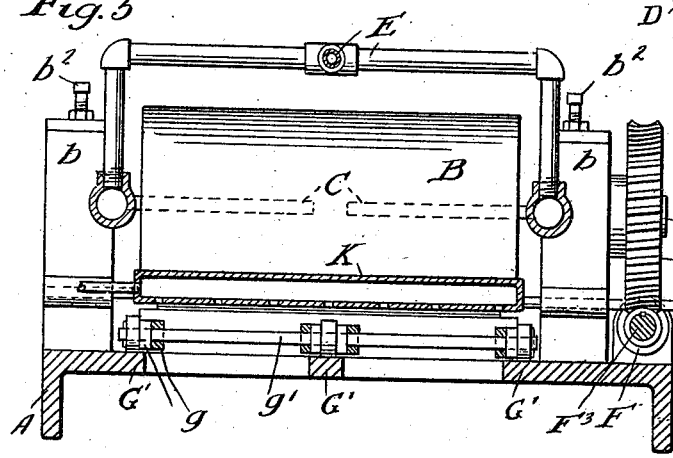
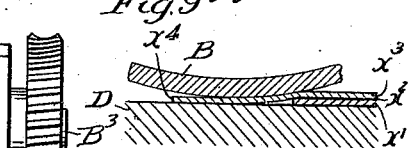
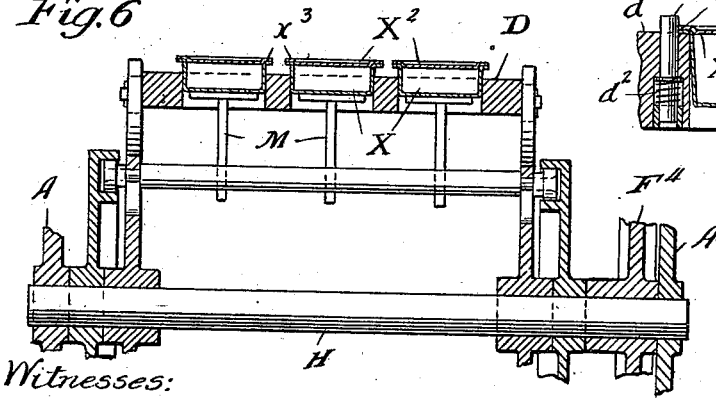
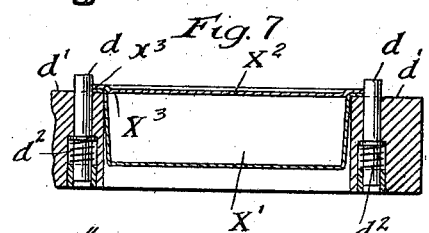
Witnesses:
Wm. Geiger
A. M. Munday
Inventors
Fred C. Wassman
Magnus E. Widell
By Munday, Evarts, Adcock & Clarke,
Attorneys

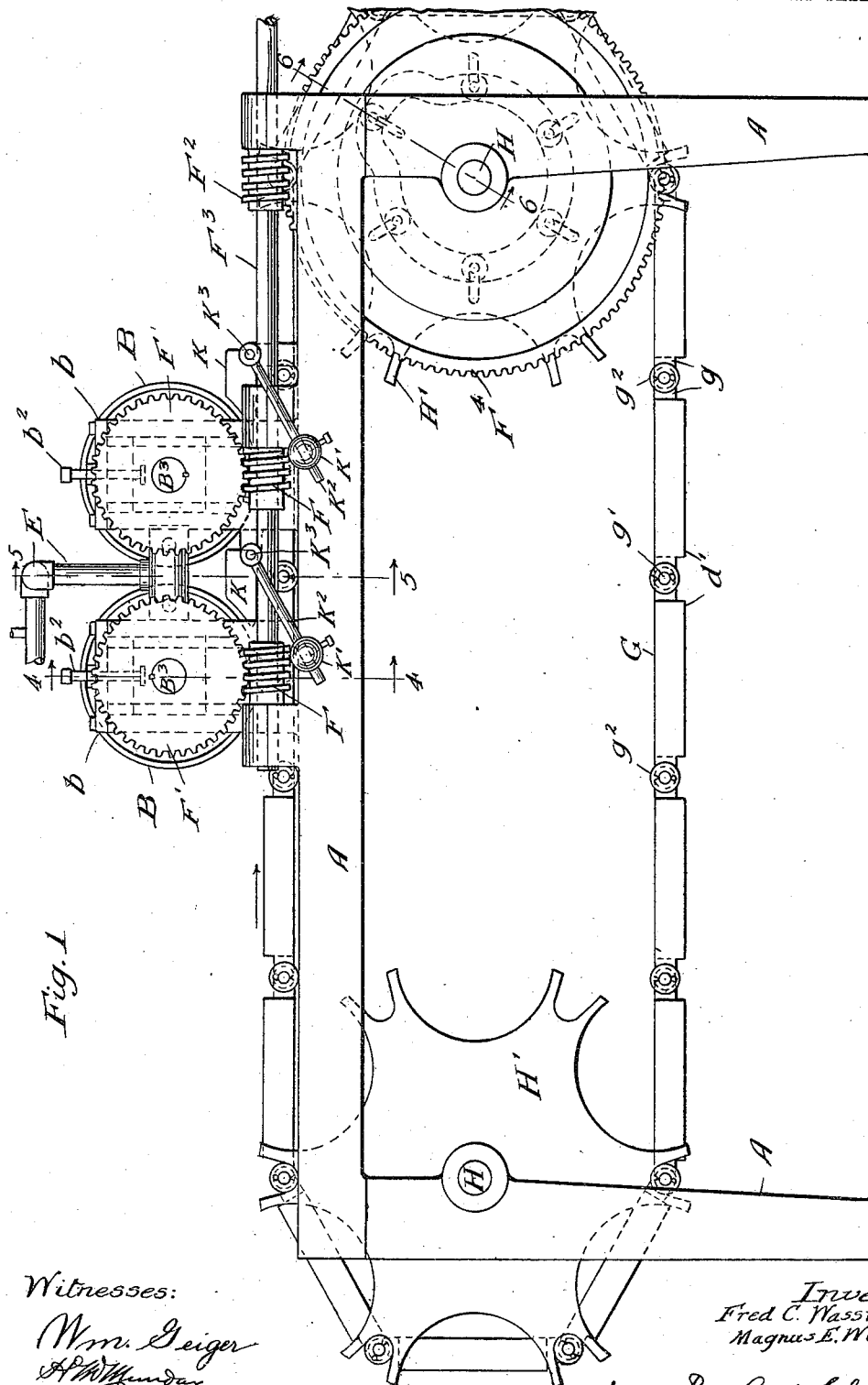

UNITED STATES PATENT OFFICE.

FRED C. WASSMAN, OF CHICAGO, AND MAGNUS E. WIDELL, OF MAYWOOD, ILLINOIS, ASSIGNORS TO AMERICAN CAN COMPANY, OF NEW YORK, N. Y., A CORPORATION OF NEW JERSEY.

SOLDERING-MACHINE.

975,912. Specification of Letters Patent. Patented Nov. 15, 1910.

Application filed March 5, 1908. Serial No. 419,256.

*To all whom it may concern:*

Be it known that we, FRED C. WASSMAN, a citizen of the United States, residing in Chicago, in the county of Cook and State of Illinois, and MAGNUS E. WIDELL, a citizen of the United States, residing in Maywood, in the county of Cook and State of Illinois, have invented a new and useful Improvement in Soldering - Machines, of which the following is a specification.

This invention relates to machines for soldering the seams or joints of cans or other sheet metal articles.

Heretofore the seams or joints of sheet metal cans and other articles have ordinarily been soldered by processes or machines operating to heat the joint throughout the whole or a considerable portion of its extent or area to the fusing point of the solder, and also to heat the parts of the can or article adjacent to the joint being soldered to a considerable extent, and then the solder being applied either before, during or after the heating operation, the heated joint and the portions of the sheet metal adjacent thereto have been cooled and the solder set while the parts or members of the joint to be united by the solder have been maintained in proximate contact with each other. These old machines for or processes of soldering by heating the whole or a considerable portion of the joint and the parts of the can or article adjacent thereto require a large amount of heat or fuel as quite a large quantity, surface or area of sheet metal is required to be raised to and maintained at a high or fusing temperature for a considerable period of time. And they also require a comparatively large amount of solder as the members or parts of the joint to be united with the solder are not always in the closest possible contact throughout the entire extent of the seam or the portion thereof being soldered at any one time, thus leaving crevices or spaces to be filled with solder and thereby increasing the amount of solder otherwise required to form the joint. They are also attended with great difficulty in producing with certainty and uniformity hermetically tight solder joints or seams, because it is difficult to maintain the parts of the joint throughout the whole extent of its length or the considerable portion thereof at which the solder is fused, in the necessary perfect and close contact while the joint is being cooled and the solder setting; and also because it is difficult to keep the fused or molten solder properly and evenly distributed throughout the entire extent of the joint or the fused portion thereof during the cooling or setting operation. And in the old machines or processes, the difficulty of producing with certainty and uniformity hermetically tight soldered joints or seams is also very greatly increased or aggravated in cases where the work being done is the soldering of final heads or covers on filled cans, owing to the heat of the soldering operation generating steam or gases under pressure within the can or vessel, which, tending to escape through the fused solder of the joint, produces fine pin holes or leaks.

The object of this invention is to provide a simple, efficient and durable machine by means of which the soldering may be done with a minimum expenditure of heat or fuel and with a minimum amount of solder, and whereby at the same time hermetically tight solder joints may be produced with certainty and uniformity whether the cans be filled or empty, and by means of which all danger of leaks or pin holes being produced by steam or gases under pressure in the can tending to force a way out through the fused or setting solder may be entirely eliminated, as well as the other difficulties and objections heretofore experienced in other machines.

The invention consists in the means employed and herein described by which this object or result is practically accomplished. That is to say, it consists in the combination with a heated pressure device by means of which heat and pressure may be applied progressively to the members of the seam or joint to be united by the solder (that is to say, point after point or minute area after minute area, successively) with an opposing cooling pressure device or holder for the can or article the seam of which is to be soldered, and which directly engages and contacts with the seam on the opposite side from the heated pressure device; the cooling pressure device being preferably mounted upon or forming a part of the movable carrier by which the can or article is conveyed under the heated pressure device. The heated pressure device is preferably a hollow cylindrical roller, and the same is preferably heated by a gas or other burner, by which flame may be projected inside the hollow roller. To cause the seam to be subjected uniformly and progressively to the action of the heated roller, the roller is rotated at a uniform speed, this being preferably done by a worm and worm gear. One member of the seam, preferably the member contacting with or engaging the cooling pressure device has the tin coat surface thereof which contacts with the other member of the seam, provided with a thin film or coating of solder fusibly united thereto, and then the two members of the joint or seam being assembled and placed in the traveling holder or movable cooling pressure device, the same is conveyed under the heated pressure device or roller, and the seam is thus subjected, point after point of its length or extent, or minute seam-area after minute seam-area, momentarily and progressively and successively to the action of heat and pressure, the heat being applied by the rotating heated roller upon one side only of the joint, and directly at the point or minute seam-area at the time under pressure, and while the opposite side of the joint or seam is continuously subjected to the cooling action of the lower pressure device or holder, both at the instant of heating and fusing and immediately thereafter; so that the solder film or coating between the members of the joint is thus progressively fused and progressively set, the setting at each point or minute area being thus also caused to take place almost instantaneously or immediately after the fusing; the heated pressure device or roller and the cooling pressure device also coöperating to keep or hold the members of the joint at each successive point or minute area where the solder is setting, directly or immediately in advance of the point or minute area where the solder is being fused, in close or perfect contact with each other by the pressure applied at the fusing point operating in connection with the setting and completely set portions of the seam or joint directly or slightly farther in advance of the particular point or minute area at the time so under pressure and being fused. The heated pressure device and also the cooling pressure device may each be of any suitable form or construction adapted to progressively set the seam or joint, point after point, or minute area after minute area, momentarily to the action of heat and pressure to thus produce progressive fusing of the solder and progressive setting thereof. A hollow continuously rotating heated roller having a gas burner for projecting flame into it is, however, the construction preferred for the heated pressure device, and a movable die or holder having an opening therein conforming to the can or article, the seam of which is to be soldered, and adapted to engage the seam upon one side, is the construction preferably employed for the cooling pressure device. A plurality of such holders or cooling pressure devices are preferably employed, and the same are preferably connected together to form an endless chain carrier so that they may pass in succession one after another under the heated roller. By this means, as the heat and pressure are applied only to one point or minute area of the seam or joint at a time by the heated roller or pressure device, and as only a very small portion or area of the seam is heated thereby to the fusing degree at any one time, and as the portions of the can or article adjacent to the seam are not heated at all, a very small amount of heat-energy or fuel is required to effect the progressive fusing and progressive setting or soldering operation, while at the same time heating or fusing is done very quickly at each successive point or minute area of the seam, and the setting or cooling of the fused solder also very quickly and almost instantaneously follows up the fusing, point after point, or minute area after minute area. The consequence or result of this is that the fusing and soldering apparently takes place in the somewhat surprising or paradoxical manner of neither heating the article or can, its contents, or even the seam or joint itself which is soldered, because the very moment the can or article or seam is soldered by this means and issues from under the heating roller, the soldered can or seam is apparently as cool as it was before the soldering operation began, and may be grasped with the hand the instant it leaves the heated roller.

As in this invention, the pressure upon the parts or members of the seam to be united by the solder is applied only to one point or minute area of the seam or joint at a time by the heated roller or other like heated pressure device, in conjunction with the coöperating cooling pressure device or can holder or other like cooling instrumentality, and directly at the point or minute area of the seam which is at the instant fused, the pressure exerted by the heated roller, though it may be limited in degree, is sure to maintain the members of the seam at each particular minute area thereof where the solder is being fused and being set, in close and perfect contact with each other and entirely free from crevices or vacant spaces between them, so that perfect soldering may be effected by this means with a very limited or minimum amount of solder. And as the fusing and setting or soldering is done as before stated, without any appreciable heating of the can or article, or the portion thereof adjacent to the seam or of its contents, or even of the seam or joint being soldered, so far as any considerable or appreciable extent of such seam or joint is concerned, the soldering takes place without any tendency whatever to produce steam or other gases under pressure within the can; so that all danger of any escaping steam or gas producing pin holes and leaks is entirely eliminated or prevented. As by this means, it is only the seam portion of the can body and cover or article that is heated at all, and as this seam portion is heated progressively or successively point after point or minute seam area after minute seam area, it is only a very small portion of the seam that is heated to the fusing point at any one time so that the adjacent portions of the seam and of the can or article being cooled themselves materially aid the opposing lower or cooling pressure device in progressively and quickly or almost instantaneously cooling and setting each successive fused point or minute area of the seam. As the solder film or coating is already fusibly united to the tin coat surface of one member of the seam, the soldered joint which unites the two members of the seam is in one sense half formed before the progressive fusing and setting operation takes place, and it is for this reason of material advantage in practicing the invention that the cooling pressure device should contact directly with that member of the seam to which the solder coating or film is already fusibly united and that the heated pressure device should contact directly with that member of the seam whose tin coat surface requires yet to be fusibly united with the solder film or coating on the other member of the seam.

As the heated roller or pressure device only contacts with the seam or joint upon one side thereof, while the opposing holder, die or pressure device, which contacts with the other side of the seam remains cool or unheated, the action of the heated pressure device on one side in conjunction with the cooling pressure device on the other side of the seam, in effect causes the heating or fusing action to extend only sufficiently through the joint to effect the proper fusing of the solder, and thus causes the fused solder at the particular point or minute area of the seam directly contacting with the heated roller or pressure device to very quickly and almost instantaneously set or cool as soon as such point or minute area passes out of direct contact with the heated roller or pressure device.

In soldering the end seams of rectangular cans, such, for example, as sardine cans, the heating roller and the coöperating can holder or cooling pressure device are so arranged as to cause the roller to occupy a diagonal position in respect to the seam, so that that portion of the seam which is at one corner of the rectangular can will be the first portion progressively fused and progressively set or soldered, and the portion at an opposite corner, the last portion fused and soldered. This is especially useful in soldering the final heads upon filled cans, as it leaves any surplus liquid or other fluid within the can free to be pressed out or escape at the final corner portion of the seam which passes last under the heated roller and thus entirely prevents escaping liquid or fluid from in any way interfering with the fusing and soldering operation until the very last point of the seam is closed by the pressure of the heated roller, and fused and set or soldered. In soldering such cans, the covers of which have integral key opening tongues, the corner of the can at which the tongue is located, should be so placed in the holder or cooling pressure device as to be the last to pass under the heated roller in the progressive soldering operation; as the projecting tongue causes the seam to leave the heated pressure roller more smoothly, and as the projecting portion of the tongue still under the heated pressure roller tends to hold the two members of the seam directly in advance thereof in close contact with each other until the solder therebetween becomes fully set.

In the accompanying drawing forming a part of this specification, Figure 1 is a side elevation of a soldering machine embodying the invention. Fig. 2 is a plan view. Fig. 3 is a vertical section on line 3—3 of Fig. 2. Fig. 4 is a vertical cross section on line 4—4 of Fig. 1. Fig. 5 is a vertical section on line 5—5 of Fig. 1. Fig. 6 is a detail partial cross section on line 6—6 of Fig. 1. Fig. 7 is a detail section on line 7—7 of Fig. 2 through one of the cooling pressure devices or can holders and Fig. 8 is a detail sectional view indicating the progressive solder fusing and progressive solder setting principle or mode of operation of the invention. Fig. 9 is a similar view illustrating the action of the tongue on the cover of a key-opening can in passing last from under the heated roller in holding the members of the seam immediately in advance thereof in contact with each other.

In the drawing, A represents the frame of the machine, B the heated pressure device, preferably a hollow cylindrical roller, C the heating device for heating the roller B, the same being preferably a gas burner by which flame may be projected inside the hollow rotating roller B.

D is the opposing cooling pressure device, preferably in the form of a holder or die for receiving and supporting the can or other article X, the seam $x$ of which is to be soldered, and which engages the seam or joint on the opposite side from the heated roller or pressure device and opposes the pressure thereof.

The hollow heated roller is preferably made long enough to extend across a plurality of cans X, as, for example, three, so that the seams of a plurality of cans may be simultaneously passed under the rolls and simultaneously soldered. The hollow roller B is preferably double ended or furnished with a central dividing web $B^1$ and hub $B^2$ by which it is secured to its operating shaft $B^3$. The bearings $b$ of the roller shaft $B^3$ are preferably movably or adjustably mounted in the frame A, and furnished with springs $b^1$ and adjusting screws $b^2$ for regulating the tension of the springs, and the pressure exerted by the heated roller B upon each point or minute area of the seam as the seam passes progressively under the heated roller.

E represents gas or other fuel supply pipes by which gas is supplied to the heaters or burners C C, which preferably project into the heated roller from the opposite ends thereof.

The heated roller B is rotated at a uniform speed, this being preferably done by a worm F and worm gear $F^1$ on the shaft $B^3$ of the heated roller. As shown in the drawing, the article X, the seam $x$ of which is to be soldered, is represented as being a rectangular sardine can, the body $X^1$ of which is furnished at its upper end with a soldering flange or seam member $x^1$, the upper tin coat surface of which is provided with a solder film or coating $x^2$ fusibly united therewith, and the cover $X^2$ of which is represented as having a countersunk portion $X^3$ fitting snugly within the upper end or mouth of the can body $X^1$, the cover $X^2$ having a soldering flange or joint member $x^3$, one corner of which is provided with an integral tongue $x^4$ for opening the can in the usual manner with a key.

The opposing cooling pressure device D is shown in the drawing as consisting of a die or holder having a socket or opening adapted to receive the can or article, the seam of which is to be soldered, and to support the same by direct engagement with the soldering flange or member $x^1$ of the article or can which is to be soldered. A plurality of cooling pressure devices or holders D are preferably arranged side by side so that the seams of a plurality of articles may be passed simultaneously under the heating pressure device or roller B and simultaneously soldered.

The cooling pressure devices or holders D are mounted upon a movable carrier G so that they may be passed in succession, one after another under the heated roller B. Any suitable means may be employed for conveying or passing the can holders or cooling pressure devices D under the heated pressure roller B. An endless chain carrier G is, however, preferably employed for this purpose, and the holders or dies D may preferably be formed integral with the links $g$ of the carrier G, as illustrated in the drawing, the dies or holders D having integral hinge ears or link devices $g$ through which the connecting pivot pins $g^1$ of the carrier links extend. The frame A of the machine is preferably provided with a track or way $G^1$ to support the link chain carrier G and the holders or cooling pressure devices D thereon. To diminish the friction, the connecting pins or shafts $g^1$ of the carrier are preferably furnished with wheels or rollers $g^2$ to travel upon the guide or track $G^1$. The carrier G is continuously driven at a uniform speed with the heated pressure device or roller B by means of a worm $F^2$ on the worm shaft $F^3$ which meshes with a worm gear $F^4$ on the shaft H of one of the sprocket wheels $H^1$ of the endless chain G. If the cans or articles, the seams of which are to be soldered, are of a rectangular form, the holders D are preferably arranged diagonally on the carrier, preferably about as illustrated in the drawing, so that the portion of the seam at one corner of the can will pass first under the heated fusing or soldering roller and the portion of the seam at the diagonally opposite corner will pass last under the action of the heated pressure roller or device; and the cans are preferably so placed in the holders, that the corner of the can cover bearing the tongue will be the last to leave the heated pressure roller.

To facilitate the progressive or successive setting of the solder, after each successive minute seam-area thereof is fused by passing under the heated roller, and to aid the action of the lower or cooling pressure device D in so cooling each successive minute seam area fused, a pressure shoe or device K is preferably employed for holding or insuring the proper contact between the seam members of the can or article being soldered and the cooling pressure device or holder D. This pressure shoe K should preferably have a concave upper face so that its inner edge may project as closely to the tangential contacting point of the heated pressure roller with the seam as possible. The pressure shoe K may preferably be hollow, and air or other cooling fluid may be continuously supplied to it to keep it at a low or cooling temperature in respect to the fusing temperature of the solder. It may preferably be lightly pressed or held against the seam of the can or article by a weight $K^1$, acting against the same through an arm $K^2$ on the supporting pivot pin $K^3$ of the pressure shoe K. In practice, it is found that the soldering of the cans may be somewhat facilitated and hermetically tight and perfect soldered seams produced with certainty and uniformity on each and every can without failure, by repeating the progressive fusing and soldering operation upon each can, the first operation ordinarily serving to produce hermetically tight and soldered joints in nearly every instance, while the succeeding operation simply serves to insure the closure of any possible imperfections that may have been left by the first operation at any point or points throughout the entire seam of the can. And for this reason, the heated pressure roller B is duplicated, so that after each can passes under the first heated soldering roller, and its seam has been once progressively fused and progressively set, the same identical operation will be repeated by the action of the second heated roller or pressure device B in coöperation with the other parts. Before any portion of the seam of the can reaches the second solder roller, or is acted upon thereby, the seam and the solder between the members thereof is cold and set whether the joint is hermetically closed at all points or not, and the operation of the second heated roller B is simply to repeat the operation and insure the closure of any possible leaks that might have been left by the operation of the first heated roller B.

The heated rollers B and the opposing cooling pressure devices D are preferably driven or moved at such speed as to cause the seam to be progressively fused and progressively soldered or passed under each roller at the rate of about one inch per second. Sardine cans, which are ordinarily some four and one half or three quarter inches in dimension from one diagonal corner to another, may thus be perfectly and hermetically soldered at the rate of about one every five or six seconds for each successive line or row, or at the rate of three every five or six seconds for the three successive rows which are passed simultaneously under the heated solder roller. Each of the cooling pressure devices, dies or holders D is preferably furnished with a plurality of spring supported guide or registering pins $d$, which project slightly above the upper or die surface $d^1$ of each holder D to aid in keeping the covers $X^2$ of the cans in place as the same are carried under the heated pressure roller B. These spring supported guide pins $d$ are especially useful in cases where the covers $X^2$ are not countersunk, or where the countersink is so shallow as not to afford a secure engagement between the cover and body of the can. As these spring supported guide pins pass under the pressure roller B, they are pushed down by the roller flush with the upper surface of the die or holder D so that they do not interfere with the pressure of the roller B upon the members of the can seam to be fused and set or soldered. The guide pins $d$ each have their own springs $d^2$.

The endless carrier G should be made long enough or sufficient in extent to give each successive can holder or die D opportunity to properly cool off after each successive passage under the heated roller B, and thus prevent any material rise in temperature of the cooling pressure devices.

One of the sprocket wheels H or its shaft is furnished with a plurality of ejectors M adapted to fit within the can holder opening or socket as the carrier G passes around this sprocket wheel, and thus cause the automatic discharge of the soldered cans from the holders D.

In Fig. 8 of the drawing, the progressive fusing and progressive setting operation is diagrammatically indicated. The solder coating $x^2$ between the two members of the seam $x^1$ $x^3$ directly at the tangential contact point $y$ of the upper seam member $x^3$ with the heated roller B is fused for a minute or limited area, as indicated, for example, between the lines $y^1$ $y^2$ because of the direct contact of the heated roller B with the upper side of the seam at the tangential point $y$ and its very close proximity thereto for a very slight distance at each side of this tangential point; and then, immediately as the seam and its cooling device or holder D travel in the direction indicated by the arrow, this fused portion immediately begins to set because of its separation from the heated roller and of the cooling action of the lower pressure device D, with which the lower member of the seam remains continuously in contact, and because of the cooling action of the surrounding portions of the seam itself and the immediately adjacent cool portions of the cover and body of the can adjacent to the seam, which all aid in very quickly subtracting sufficient temperature from the minute fused area of solder to cause the setting thereof; so that the minute area of fused solder almost instantly becomes set. If, as indicated at Fig. 8 in the drawing, the solder $x^2$ between the lines $y^1$ $y^2$ may be considered as in a fused condition, that between the lines $y^2$ $y^3$ may be considered as in a setting condition, and that in advance of the line $y^3$ in a set condition. It will thus be readily understood from Fig. 8, that as the cooling pressure device D remains constantly and directly in contact with the lower member of the seam, and as the heated pressure device B contacts with the upper member of the seam only, and only momentarily and successively, point after point or minute area after minute area, the members of the seam are pressed into very close and intimate contact with each other during the whole period that any one particular minute seam-area is under the solder fusing and solder setting operation, and that the members of the seam have no tendency or possibility of springing apart or separating after the fusing action takes place at any particular point or seam-area until it is securely united by the setting of the solder, the setting following so quickly and closely the fusing, and taking place at a point so near that at which the heated roller contacts with the upper member of the seam and clamps or presses it firmly against the lower or cooling pressure device.

It will, of course, be understood that while the line $y$ correctly indicate the tangential or contacting point between the heated pressure roller and the seam, the point $y^1$ where the solder is represented as becoming fused, and $y^2$ where it is represented as again beginning to set and $y^3$ where the solder is indicated as again having become sufficiently firmly set to exert material holding action in keeping the members of the seam in close contact with each other, are simply intended to illustrate the principle and operation of the progressive fusing and progressive setting action produced by the instrumentalities of the heated pressure device and the coöperating cooling pressure device, and are not intended to represent the exact points at which the fusing of the solder begins or at which its setting begins or ends, as the same will necessarily vary with the character of the solder and with the speed of movement of the can or its holder and with the temperature of the heated roller, and other conditions.

Having thus described the invention, what is claimed is:

1. In a soldering machine, the combination with a heated pressure device adapted to contact point after point, or minute seam-area after minute seam-area, momentarily and successively or progressively with the seam on one side, of an opposing cooling pressure device adapted to simultaneously contact with the seam throughout the whole length or extent thereof continuously on the opposite side from said heated pressure device, whereby the seam is progressively fused and progressively set and soldered, substantially as specified.

2. In a soldering machine, the combination with a heated pressure roller, of an opposing cooling pressure device, said heated pressure roller and cooling pressure device simultaneously acting on each successive portion of the seam, whereby the seam is progressively fused and progressively set, substantially as specified.

3. In a soldering machine, the combination with a heated pressure roller, of an opposing cooling pressure device conforming in shape to the seam and adapted to simultaneously contact therewith through the extent thereof, said heated pressure roller and cooling pressure device simultaneously acting on each successive portion of the seam, whereby the seam is progressively fused and progressively set, and means for rotating the said roller at a uniform speed, substantially as specified.

4. In a soldering machine, the combination with a heated pressure roller, of an opposing cooling pressure device conforming in shape to the seam and adapted to simultaneously contact therewith through the extent thereof, said heated pressure roller and cooling pressure device simultaneously acting on each successive portion of the seam, whereby the seam is progressively fused and progressively set, means for rotating the said roller at a uniform speed, and means for conveying the cooling pressure device at a uniform speed under said heated roller, substantially as specified.

5. In a soldering machine, the combination with a heated pressure roller, of a plurality of opposing cooling pressure devices each conforming in shape to the seam and contacting therewith throughout its extent and adapted to be conveyed successively one after another under said heated pressure roller, and to act upon the seam simultaneously with said pressure roller as each successive portion of the seam passes under the roller, substantially as specified.

6. In a soldering machine, the combination with a heated pressure roller, of an opposing cooling pressure device, whereby the seam is progressively fused and progressively set, said cooling pressure device having yielding guides for holding the members of the seam in assembled position without interfering with the pressure of the heated roller upon the members of the seam as the same passes under said roller, substantially as specified.

7. In a soldering machine, the combination with a heated pressure roller, of an opposing cooling pressure device, whereby the seam is progressively fused and progressively set, and a device for holding the seam in contact with said cooling pressure device at the portion thereof which has passed under said heated roller, substantially as specified.

8. In a soldering machine, the combination with a heated pressure roller, of an opposing cooling pressure device, whereby the seam is progressively fused and progressively set, said cooling pressure device having spring supported guides for holding the members of the seam in register with each other, said guides yielding or shutting down out of the way as they pass under said heated pressure roller, substantially as specified.

9. In a soldering machine, the combination with a heated pressure roller, of an opposing cooling pressure device, whereby the seam is progressively fused and progressively set, and a pressure shoe for holding the seam in contact with said cooling pressure device in advance of said heated roller, substantially as specified.

10. In a soldering machine, the combination with a heated pressure roller, of an opposing cooling pressure device, whereby the seam is progressively fused and progressively set, and a pressure shoe for holding the seam in contact with said cooling pressure device in advance of said heated roller, said pressure shoe having a concave face to adapt its inner edge to engage the seam near the tangential contacting point of the heated roller with the seam, substantially as specified.

11. In a soldering machine, the combination with a heated pressure roller, of an opposing cooling pressure device, whereby the seam is progressively fused and progressively set, and a pressure shoe for holding the seam in contact with said cooling pressure device in advance of said heated roller, said pressure shoe being hollow and provided with means for cooling the same, substantially as specified.

12. In a machine for soldering the cover seams on rectangular cans, the combination with a heated pressure roller, of an opposing cooling pressure device adapted to engage and support the can and pass it diagonally or cornerwise under said heated roller, said heated pressure roller and cooling pressure device simultaneously acting on each successive portion of the seam, substantially as specified.

13. In a soldering machine, the combination with a heated roller, of a plurality of opposing pressure devices or holders, conforming in shape to the seam and contacting therewith throughout the extent thereof and for simultaneously progressively fusing and progressively setting the seams of a plurality of cans or articles, said heated roller simultaneously applying heat and pressure at each successive point of the seam and the set portion of the seam in advance of the roller coöperating to hold the members of the seam together substantially as specified.

14. In a soldering machine, the combination with a heated pressure roller, of a plurality of opposing cooling pressure devices each conforming in shape to the seam and contacting therewith throughout the extent thereof arranged in a plurality of rows, said heated pressure roller and said cooling pressure devices acting simultaneously at successive points of the seams as the same pass under the roller, said cooling pressure devices each conforming in shape to the seam and adapted to contact therewith throughout the extent thereof, substantially as specified.

15. In a soldering machine, the combination with a heated pressure roller, of a plurality of opposing cooling pressure devices each conforming in shape to the seam and contacting therewith throughout the extent thereof, a carrier for said cooling pressure devices, and means for continuously operating said carrier to convey said cooling pressure devices one after another in succession under said heated pressure roller, said heated pressure roller and said cooling pressure devices acting simultaneously at successive points of the seams as the same pass under the roller, substantially as specified.

16. In a soldering machine, the combination with a heated pressure roller, of a plurality of opposing can holding cooling pressure devices, each conforming in shape to the seam and contacting therewith throughout the extent thereof, a carrier therefor, means for continuously rotating said heated roller and means for continuously operating the carrier, said heated pressure roller and said cooling pressure devices acting simultaneously at successive points of the seams as the same pass under the roller, substantially as specified.

17. In a soldering machine, the combination with a heated pressure roller, of a plurality of opposing can holding cooling pressure devices, a carrier therefor, means for continuously rotating said heated roller and means for continuously operating the carrier, and ejectors for discharging the soldered cans from said holding cooling pressure devices, substantially as specified.

18. In a soldering machine, the combination with a heated pressure roller, of an opposing cooling pressure device conforming in shape to the seam and contacting therewith throughout the extent thereof, whereby the seam is progressively fused and progressively set, and means for yieldingly pressing said heated roller against said opposing cooling pressure device, said heated pressure roller and cooling pressure device simultaneously acting on each successive portion of the seam, substantially as specified.

19. In a soldering machine, the combination with a heated pressure roller, of an opposing can holder conforming in shape to the seam and contacting therewith throughout the extent thereof and operating as a cooling pressure device and engaging the opposite member of the seam from that engaged by said heated pressure roller, said heated pressure roller and cooling pressure device simultaneously acting on each successive portion of the seam, substantially as specified.

20. In a soldering machine, the combination with a heated pressure roller, of an opposing can holder operating as a cooling pressure device and engaging the opposite member of the seam from that engaged by said heated pressure roller, and a worm and worm gear for driving said heated pressure roller, substantially as specified.

21. In a soldering machine, the combination with a heated pressure roller, of an opposing can holder operating as a cooling pressure device and engaging the opposite member of the seam from that engaged by said heated pressure roller, and a worm and worm gear for driving said heated pressure roller, and a worm and worm gear for imparting the traveling movement to said can holder, substantially as specified.

22. In a soldering machine, the combination with a plurality of heated pressure rollers adapted to engage the same side of a seam one after another, of a plurality of opposing can holding cooling pressure devices, said heated pressure rollers and said cooling pressure devices acting simultaneously on successive points of the seams, said cooling pressure devices each conforming in shape to the seam and adapted to contact therewith throughout the extent thereof, substantially as specified.

23. In a soldering machine, the combination with a hollow heated pressure roller, of a burner for projecting flame into said roller to heat the same, and an opposing cooling pressure device conforming in shape to the seam and contacting therewith throughout the extent thereof and engaging the opposite side of the seam from said roller, said heated pressure roller and cooling pressure device simultaneously acting on each successive portion of the seam, substantially as specified.

24. In a soldering machine, the combination with a hollow heated roller, of an opposing cooling pressure device conforming in shape to the seam and contacting therewith throughout the extent thereof and means for heating said roller, said heated roller and said cooling pressure device operating simultaneously on successive portions of the seam, substantially as specified.

25. In a soldering machine, the combination with a heated pressure device adapted to progressively apply heat and pressure to successive points of the seam throughout the length or extent thereof, means for heating said device, and an opposing cooling pressure device conforming in shape to the seam and contacting therewith throughout the extent thereof, substantially as specified.

26. In a soldering machine, the combination with a supporting track or way, of an endless flexible carrier, a plurality of can holding cooling pressure devices on said carrier, each conforming in shape to the seam and contacting therewith throughout the extent thereof and a hollow heated pressure roller coöperating in turn with each of said can holding cooler pressure devices to progressively fuse and progressively set the solder of the seam, said heated pressure roller and said cooling pressure devices acting simultaneously at successive points of the seams as the same pass under the roller, substantially as specified.

27. In a soldering machine, the combination with a supporting track or way, of an endless flexible carrier, a plurality of can holding cooling pressure devices on said carrier, and a hollow heated pressure roller coöperating in turn with each of said can holding cooler pressure devices to progressively fuse and progressively set the solder of the seam, and a pressure shoe engaging the seam after passing under said heated roller, substantially as specified.

28. In a soldering machine, the combination with a supporting track or way, of an endless flexible carrier, a plurality of can holding cooling pressure devices on said carrier each conforming in shape to the seam and contacting therewith throughout the extent thereof, and a hollow heated pressure roller coöperating in turn with each of said can holding cooler pressure devices to progressively fuse and progressively set the solder of the seam, and a second heated roller which repeats the progressive fusing and progressive setting operation, each of said heated rollers and said can holding cooler pressure devices acting simultaneously at successive points of the seam, substantially as specified.

29. In a soldering machine, the combination with a supporting track or way, of an endless flexible carrier, a plurality of can holding cooling pressure devices on said carrier each conforming in shape to the seam and contacting therewith throughout the extent thereof, and a hollow heated pressure roller coöperating in turn with each of said can holding cooler pressure devices to progressively fuse and progressively set the solder of the seam, and a second heated roller which repeats the progressive fusing and progressive setting operation, and a worm and worm gears for rotating said heated rollers at a uniform speed, each of said heated rollers and said can holding cooler pressure devices acting simultaneously at successive points of the seam, substantially as specified.

30. In a soldering machine, the combination with a supporting track or way, of an endless flexible carrier, a plurality of can holding cooling pressure devices on said carrier, and a hollow heated pressure roller coöperating in turn with each of said can holding cooler pressure devices to progressively fuse and progressively set the solder of the seam, and a second heated roller which repeats the progressive fusing and progressive setting operation, a worm and worm gears for rotating said heated rollers at a uniform speed, and a worm and worm gear for driving said carrier at a uniform speed, substantially as specified.

31. In a soldering machine, the combination with a supporting track or way, of an endless flexible carrier, a plurality of can holding cooling pressure devices on said carrier each conforming in shape to the seam and contacting therewith throughout the extent thereof, and a hollow heated pressure roller coöperating in turn with each of said can holding cooler pressure devices to progressively fuse and progressively set the solder of the seam point after point as the can is conveyed under the roller, and a worm and worm gear for operating said carrier, substantially as specified.

32. In a soldering machine, the combination with a supporting track or way, of an endless flexible carrier, a plurality of can holding cooling pressure devices on said carrier each conforming in shape to the seam and contacting therewith throughout the extent thereof, and a hollow heated pressure roller coöperating in turn with each of said can holding cooler pressure devices to progressively fuse and progressively set the solder of the seam point after point as the can is conveyed under the roller, and a worm and worm gear for operating said heated roller, substantially as specified.

33. In a soldering machine, the combination with a supporting track or way, of an endless flexible carrier, a plurality of can holding cooling pressure devices on said carrier, and a hollow heated pressure roller coöperating in turn with each of said can holding cooler pressure devices to progressively fuse and progressively set the solder of the seam, and a can ejecting means for the soldered cans, substantially as specified.

34. In a soldering machine, the combination with a supporting track or way, of an endless flexible carrier, a plurality of can holding cooling pressure devices on said carrier each conforming in shape to the seam and contacting therewith throughout the extent thereof, and a hollow heated pressure roller coöperating in turn with each of said can cooling pressure devices to progressively fuse and progressively set the solder of the seam point after point as the can is conveyed under the roller, and a burner for projecting flame into said hollow roller to heat the same, substantially as specified.

FRED C. WASSMAN.
MAGNUS E. WIDELL.

Witnesses:
EDMUND ADCOCK,
WILLIAM A. GEIGER.